(12) United States Patent
McCoy

(10) Patent No.: US 7,380,436 B2
(45) Date of Patent: Jun. 3, 2008

(54) ROLLOVER COMPONENT TEST FIXTURE AND METHODOLOGY

(75) Inventor: Robert McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/276,669

(22) Filed: Mar. 9, 2006

(65) Prior Publication Data

US 2006/0207353 A1 Sep. 21, 2006

(51) Int. Cl.
*G01M 17/00* (2006.01)

(52) U.S. Cl. .................................... 73/12.04

(58) Field of Classification Search ............... 73/11.04, 73/12.01, 12.04, 12.05, 12.06, 12.07, 12.09, 73/12.11, 865.6

See application file for complete search history.

(56) References Cited

U.S. PATENT DOCUMENTS

| 6,178,805 | B1 | 1/2001 | Kosaraju et al. |
| 6,256,601 | B1 * | 7/2001 | Wipasuramonton et al. ... 703/8 |
| 6,522,998 | B1 | 2/2003 | Mazur et al. |
| 6,622,541 | B2 | 9/2003 | Stein et al. |
| 6,651,482 | B1 | 11/2003 | Moffatt et al. |

* cited by examiner

*Primary Examiner*—Eric S McCall
(74) *Attorney, Agent, or Firm*—Fredrick Owens

(57) ABSTRACT

The invention is an apparatus for simulating attributes of a vehicle during a certain inertial event. The apparatus comprises a rigid shell, an occupant compartment surrounded by the rigid shell, and a carriage supporting the occupant compartment and the rigid shell. The test apparatus transforms the vehicle into a system of reusable components. The rigid body shell eliminates damage to body components by protecting the occupant compartment. The invention also provides a method of simulating a tripped rollover event of a vehicle with the test apparatus and a cart.

20 Claims, 7 Drawing Sheets

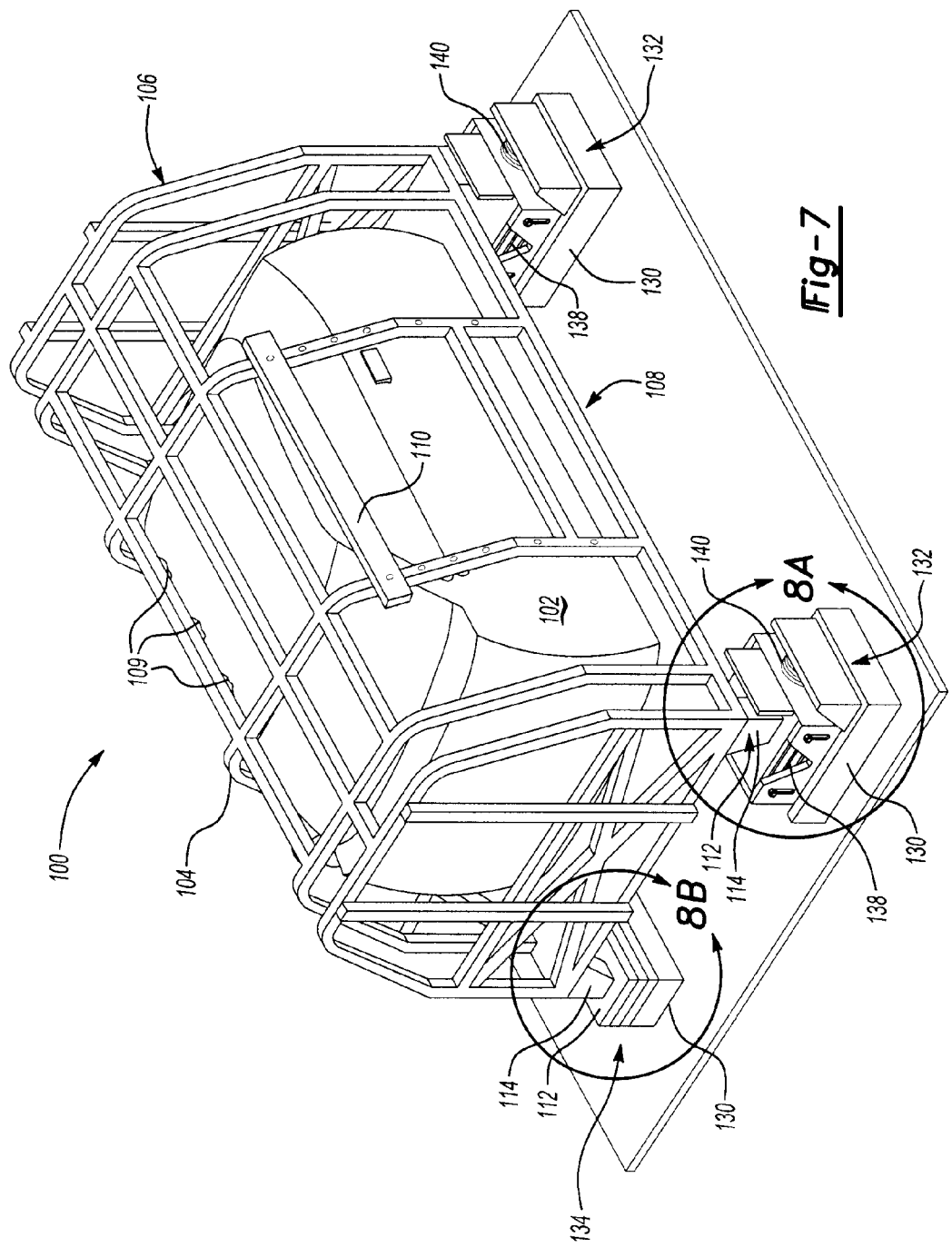

ROLLOVER COMPONENT TEST FIXTURE AND METHODOLOGY

FIELD OF THE INVENTION

This invention relates to an apparatus and a method for simulating vehicle rollover crash testing and more particularly, to an apparatus and a method which are adapted to provide repeatable, non-destructive and reliable rollover simulations.

BACKGROUND OF THE INVENTION

Rollover crash tests are commonly used in the development of rollover detection sensors, algorithms and occupant protection systems. As in many other crash tests, partial damage or complete destruction of the vehicle is not uncommon. The building of new vehicle prototypes alone is a costly endeavor which requires engineers to attempt to maximize the amount of data and analysis gained from a limited number of crash tests available.

Due to the limited availability of destructive crash tests, a majority of the tests used to develop current rollover detection algorithms and occupant protection systems are laboratory based. Safety engineers and researchers have sought to develop component level testing methods that replicate key aspects of a crash test in a repeatable and non-destructive manner. Laboratory based rollover tests often utilize a mechanism, such as sliding a vehicle into a curb or placing the vehicle on a cart and decelerating the cart, to induce vehicle roll. For tripped rollover tests, the key phase events of which the occupant compartment is involved are: the vehicle lateral velocity phase, the tripping or transition to rotation phase, the free flight rotation phase, and the ground impact or landing phase.

Conventional testing attempts to simulate or replicate a few of the key phases of a given crash test. "Spit Test" type devices are capable of generating the free flight motion often seen in the airborne phase of a rollover test. The Dynamic Rollover Fixture and the Rollover Restraint Tester were developed by NHTSA and are examples of these types of devices. "Spit Test" type devices that are capable of generating the free flight motion often seen in the airborne phase of a rollover. The driving force for these devices is provided by a drop tower and free-weight system. The angular velocity ranges from 180°/s to 290°/s and is generated by various combinations of drop weight and drop height. However, it focuses only on the rotational motion occurring during the free flight phase of a typical rollover crash test.

Another conventional testing device which does not include all of the key phases was developed by Breed. This device includes only a portion of the occupant compartment and simulates a quarter turn roll with no free flight motion. The fixture is accelerated using a HYGE™ sled to reach the desired lateral velocity, and the "compartment" is pushed outward by hydraulic pistons at the bottom, causing the compartment fixture to rotation clockwise about the pivot at the top of the compartment fixture allowing the dummy to experience a vehicle rotation. However, this device fails to simulate the occupant compartment free flight or landing phases.

Another conventional testing device attributed to Pywell et al. simulates different quasi-static vehicle rollover conditions for characterizing various belt restraint systems in terms of dummy's excursion. This device can generally achieve a peak roll rate from 240°/s to 360°/s with a rotation up to 180°. However, it fails to simulate the occupant compartment flight phase or the landing phase.

To date, most of the methods used in rollover tests and reported in the literature are either dynamic or quasi-static tests that involve rotating or "inverting" an occupant around a stationary axis. Many have been successful in simulating the rotational phase of a rollover test. However, they fail to take a vehicle's lateral translational motion into consideration. These methods primarily have been used for occupant motion studies, restraint system evaluation and development. Since most vehicle laboratory based rollover events utilize a tripping mechanism that generates lateral vehicle motion, the aforementioned methods fail to adequately characterize the transition of the occupant compartment from lateral to rotational vehicle motion. Additionally, the effects of ground contact are either not simulated or done in a very simplistically manner.

Therefore, a new component rollover test device and methodology is needed. A repeatable, reusable and representative component level testing which incorporates all of the key phases could potentially be instrumental in developing robust occupant restraint systems, rollover detection sensors and understanding occupant kinematics during rollovers.

SUMMARY OF THE INVENTION

The present invention of a component rollover test apparatus resolves the problems of the prior art. The invention is an apparatus for simulating attributes of a vehicle during a certain inertial event. The apparatus comprises a rigid shell, an occupant compartment surrounded by the rigid shell, and a carriage supporting the occupant compartment and the rigid shell.

One advantage of the test apparatus is it provides the potential to develop rollover restraint and sensor systems in a more timely and economically efficient manner. The test apparatus transforms a crash test of a vehicle into a system of reusable components. The rigid body shell eliminates damage to body components by protecting the occupant compartment. The rigid body also provides the ability to adjust and specify center transition of gravity, inertial properties, and ride height. The test apparatus simulates the transition of lateral vehicle motion into rotational motion commonly seen in laterally tripped laboratory rollover crash tests. The test apparatus also provides the potential to develop rollover restraint and sensor systems in a more timely and economically efficient manner. The test apparatus can be built to model any type of vehicle: a typical sedan, a mid-size sport utility vehicle (SUV), pickup, school bus, etc. The occupant compartment can support complete first and second row seating positions and vehicle interiors. The flexibility of the occupant compartment creates the ability to retro-fit occupant restraint systems and interior components such as side curtains, seat belts, on-board cameras and other data acquisition tools.

Another advantage of the test apparatus is the elimination of damage to vehicle suspension components which often occur during impacts above 25 mph. The carriage replicates both the leading and trailing sides of the vehicle wheel and suspension compliance. Spring stiffness can be specified individually for each location. The carriage provides a consistent simulation of the 'curb to wheel' contact interaction that represents a tripped rollover. The consistency reduces test to test variability.

The present invention also provides a method of simulating a tripped rollover event of a vehicle with a test apparatus and a cart. The test apparatus comprises a carriage, an occupant compartment, and a rigid shell surrounding the occupant compartment. The method comprises the first step of propelling the test apparatus arranged on the cart at a desired velocity. The next step comprises decelerating the test apparatus on the cart to arrest the movement of the occupant compartment and initiating rotational rollover movement of the occupant compartment. The final step comprises impacting a landing surface with the rigid shell whereby the occupant compartment does not contact the landing surface.

One advantage of the present invention and method is its capability of representing the occupant compartment transition of lateral vehicle motion into rotational motion commonly seen in laterally tripped laboratory rollover crash tests. The test apparatus rollover event comprises a lateral velocity phase, a lateral deceleration phase, a transition-to-rotation phase, a free-flight phase, and an impact phase. The test apparatus and method provide the ability to provide representative vehicle roll rates, angles, velocities and accelerations and associated occupant motion for lateral tripped rollover crashes.

BRIEF DESCRIPTION OF THE DRAWINGS

FIG. 7 is a perspective view of a test apparatus according to the invention;

DETAILED DESCRIPTION OF THE PREFERRED EMBODIMENTS

Figure 1:
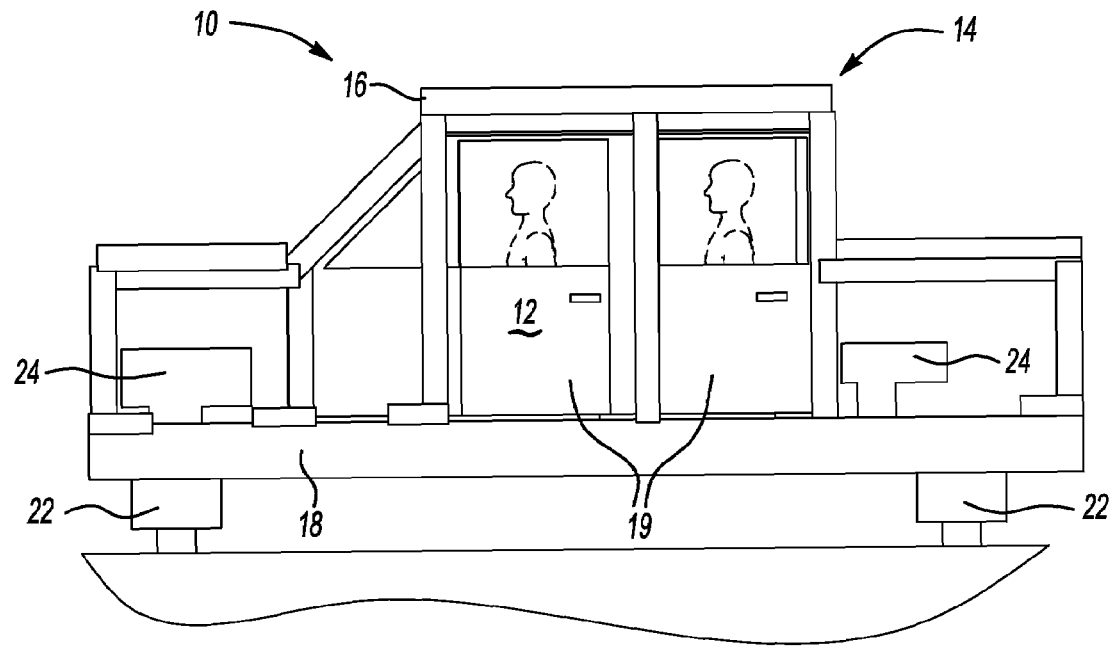
FIG. 1 is an elevated side view of a rigid shell and occupant compartment according to the invention.
Figure 2:
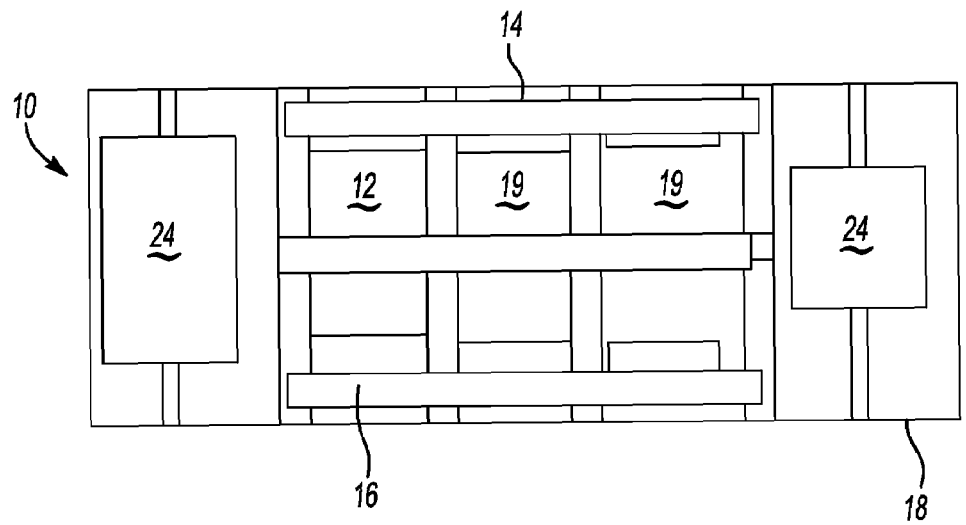
FIG. 2 is a top plan view of a rigid shell and occupant compartment according to the invention.
Figure 3:
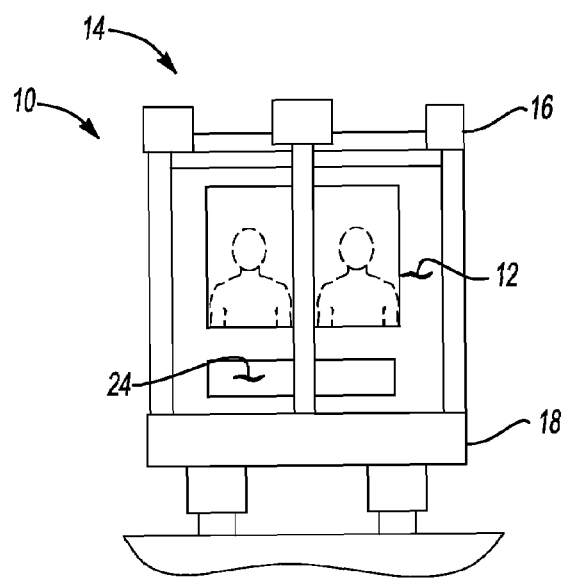
FIG. 3 is an elevated end view of a rigid shell and occupant compartment according to the invention.
Figure 4:
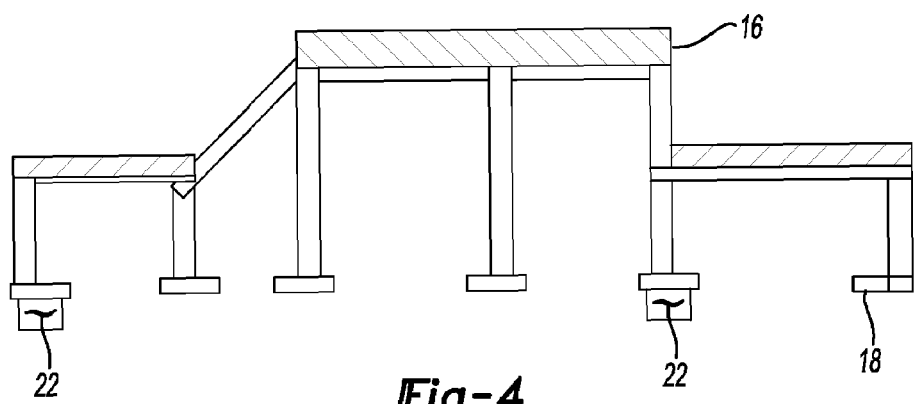
FIG. 4 is an elevated side view of an upper portion of a rigid shell according to the invention.
Figure 5:
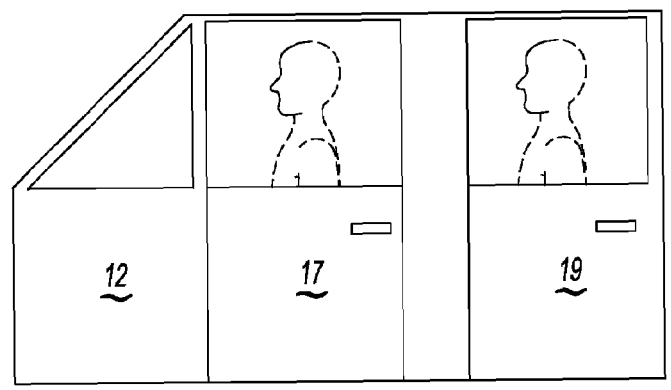
FIG. 5 is a side view of a vehicle compartment according to the invention.

Referring to FIGS. 1-6a, a portion of a test apparatus 10 according to the invention is shown in various views. To maintain consistency throughout this description, the term leading edge shall refer to the side of the test apparatus which will initially experience a tripping impulse. The term trailing edge shall refer to the side of the test apparatus 180 degrees opposite the leading edge. The portion of the test apparatus 10 comprises an occupant compartment 12 and a rigid shell 14. The rigid shell 14 comprises a top portion 16 and a bottom or platform portion 18. The occupant compartment 12 is rigidly attached to the platform portion 18 by means of welding or conventional fasteners such as bolts. The occupant compartment 12 represents a portion of the simulated vehicle. The platform portion 18 supports the occupant compartment 12.

The occupant compartment 12 can be constructed from a specific vehicle by removing the suspension, power train and fuel system components. As shown, the front end which might contain an engine compartment has been removed. Similarly the rear end which might contain the trunk or storage compartment has been removed. The interior of the occupant compartment 12 can include any relevant interior trim, data collection equipment, restraint systems, or one or more rows of seating positions 17, 19 respectively. Additionally, the interior can include one or more test dummies representative of actual human beings. The occupant compartment 12 is surrounded and protected by the rigid shell 14.

The rigid shell 14 helps to prevent deformation to the occupant compartment 12 by transferring the energy of the crash impact to the ground or to a landing surface. The rigid shell 14 comprises metal beams such as steel, supporting a lattice of beams and tubing attached at various locations. The tubes are attached by welding, bolts or other conventional fastening methods. In the alternative, portions of the rigid shell 14 can be detached (not shown) to provide access to the interior of the occupant compartment 12 such as the seating positions 19, and then reattached prior to testing. The tire geometry of the simulated vehicle is represented by contact pads 22 extending from the bottom of the platform portion of the rigid shell 18. Additional mass 24 can be mounted to the interior of the rigid shell 14 at discrete locations such as in the front and rear of the rigid shell 14 to compensate for the absence of engine or suspension components. In the alternative, additional mass can be fixed to the exterior surface of the rigid shell 14. The amount and location of the mass 24 can be chosen to produce the desired test apparatus inertial properties or to simulate the center of gravity of the target vehicle. The dimensions of the rigid shell 14 and mass 24 are important when the test apparatus 10 is used to represent a given vehicle or vehicle type. Overall, the dimensions such as wheel base, tire track width, and various inertial properties of the test apparatus are set for the vehicle being simulated.

The bottom platform portion 18 of the rigid shell 14 may have a plurality of attachment points 26 for securing the rigid shell. The bottom platform portion 18 can be fitted with adjustable solid masses 24 that can be arranged to allow for adjustment of the appropriate center of gravity for the simulated vehicle.

Figure 6A:
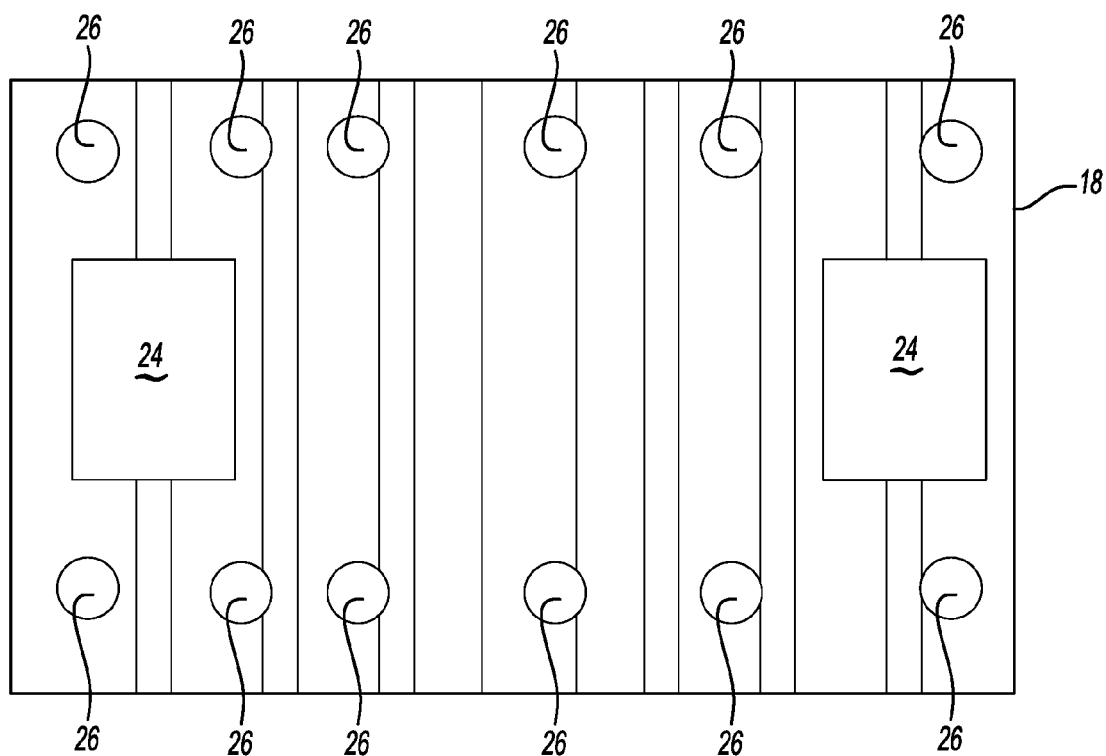
FIG. 6A is a top plan view of a bottom platform portion of the rigid shell according to the invention.
Figure 6B:
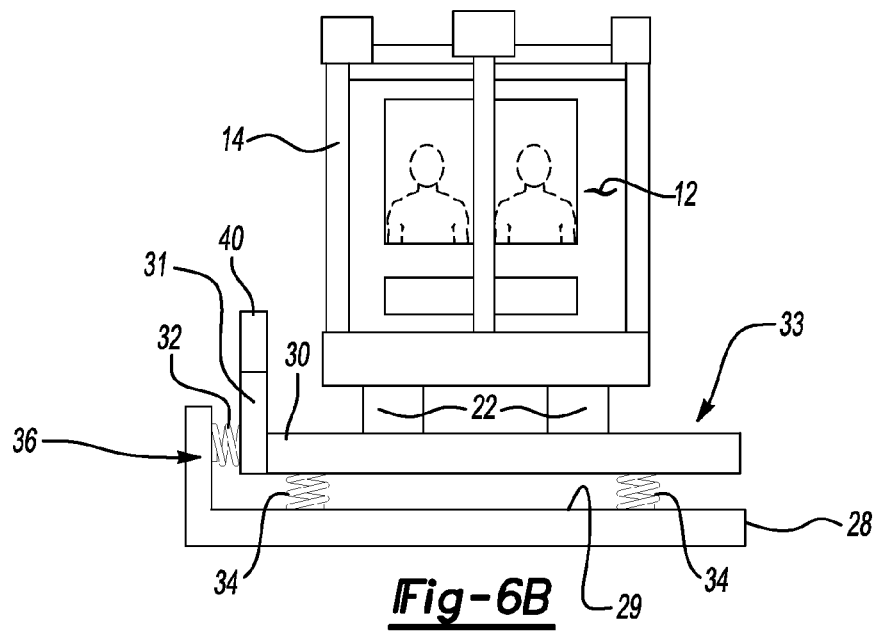
FIG. 6B is a front elevated plan view of the test apparatus according to the invention.

Referring now to FIG. 6B, a front plan view of the test apparatus 10 according to the present invention is shown supported by a cart 28. The occupant compartment 12 and rigid shell 14 are supported by a carriage 30. The tire contact pads 22 are each supported by a top surface 33 of the carriage. A cart leading edge 36 extends vertically above a cart top surface 29. The carriage 30 provides compliance in the horizontal direction and the vertical direction. For example, a spring 32 represents compliance in the horizontal direction between the carriage 30 and the cart 28. The horizontal spring 32 provides compliance between a leading edge 31 of the carriage 30 and the cart leading edge 36. Springs 34 represent the vertical compliance between the carriage 30 and the cart 28. A curb 40 is attached to a leading edge of the carriage 31. The curb 40 extends vertically above the top surface 33 of the carriage 30 and represents a tripping mechanism for the rigid shell 14.

The carriage 30 imitates a suspension by using compliance acting in horizontal and vertical directions to generate a response similar to the replicated vehicle suspension. The compliance characteristics may be determined by calculating the resultant of two springs in series representing the compliance of the actual vehicle suspension and tires. The combination of springs 32, and 34, allow for rotation by the occupant compartment 12 about a longitudinal axis. For a single replicated tire/suspension system, the effective vertical spring stiffness is calculated by taking the resultant of two springs in series. In another alternative embodiment of this invention, the front and rear suspensions may be lumped together as one spring by calculating the resultant of two springs in parallel.

Referring now to FIG. 7, a preferred embodiment of a test apparatus 100 is shown. The test apparatus 100 includes an occupant compartment 102 and a rigid shell 104. The rigid shell 104 comprises a top portion 106 and a bottom or platform portion 108. The occupant compartment 102 is rigidly attached to the top portion 106 and the platform portion 108 by spot welds 109. In the alternative, other conventional fasteners such as carriage bolts and nuts, may be used. As shown, the occupant compartment 102 simulates a a portion of a sport-utility vehicle. In the alternative, the occupant compartment 102 may simulate a sedan or sub-compact styled car. The platform portion 108 supports the occupant compartment 102.

The rigid shell 104 is comprised of steel rails supporting a lattice of metal beams and tubing attached at various locations. The tubes are attached by welds, bolts or other conventional fastening methods. In the alternative, shell portions 110 of the rigid shell 104 can be detached to provide access to the interior of the occupant compartment 102 or, to adjust the mass or center of gravity. Portions 110 can then be reattached prior to a test. The tire geometry of the simulated vehicle is represented by contact pads 112 on the bottom of the rigid shell 108. Rigid feet 114 extend vertically below the rigid shell bottom portion to support the rigid shell 104 and form a portion of the contact pads 112. Shown here, the simulated vehicle has four tire contact pads 112 located near each of the separate corners of the bottom of the rigid shell 108. The contact pads 112 each interface with the carriage 130.

Figure 8A:
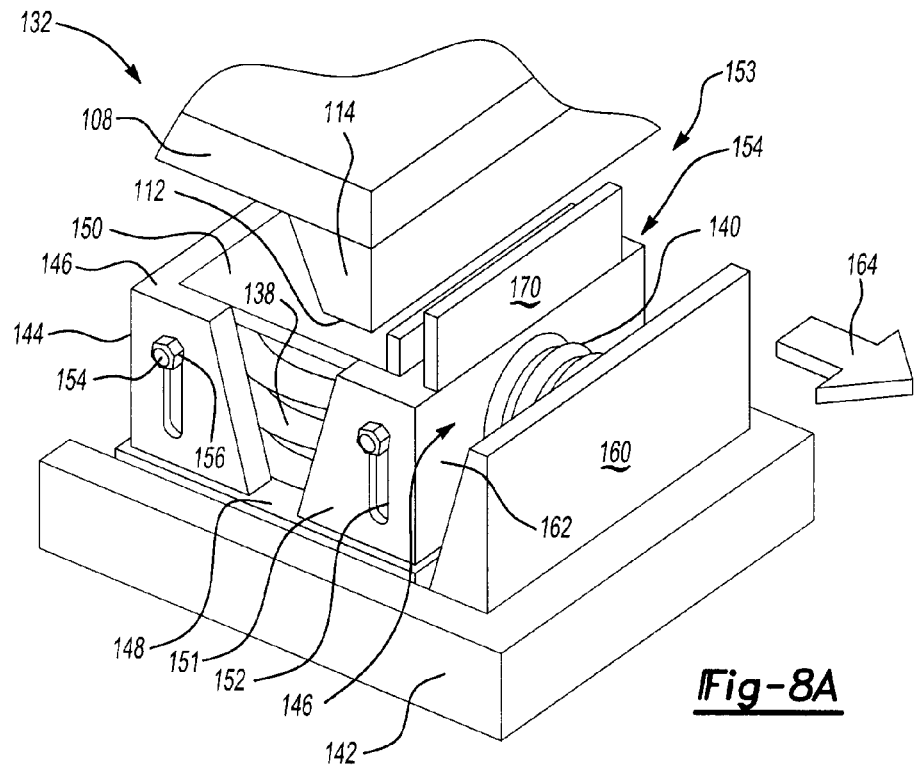
FIG. 8A is a perspective view of a leading edge portion of the carriage according to the invention.
Figure 8B:
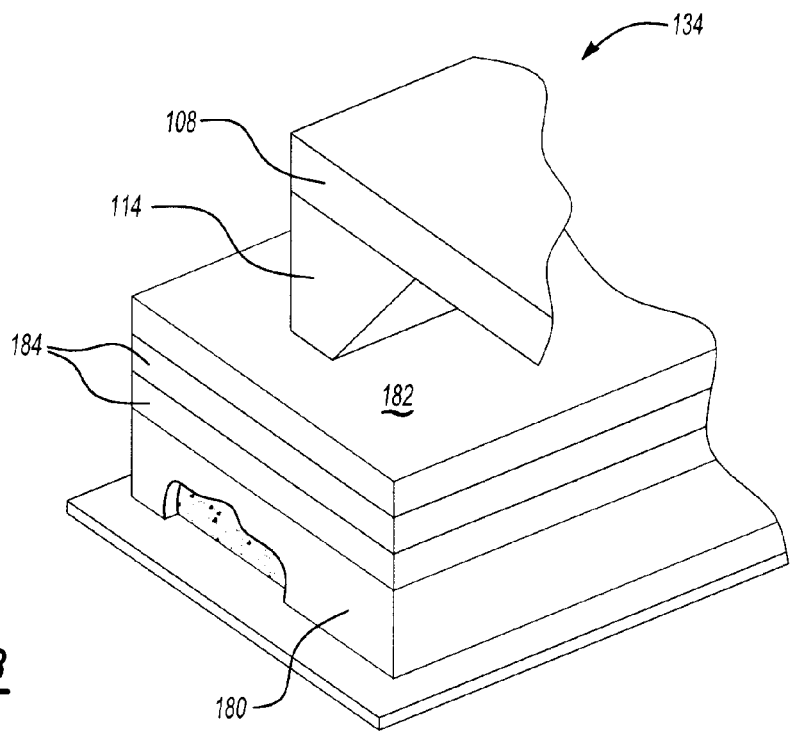
FIG. 8B is a perspective view of a trailing edge portion of the carriage according to the invention.

Referring to FIGS. 7, 8A, and 8B, the carriage 130 is shown supporting the rigid shell 104 and the occupant compartment 102 at each of the contact pads 112. The carriage 130 simulates the tires and the suspension of a vehicle and comprises a pair of leading edge portions 132 and a pair of trailing edge portions 134 to support the each of the contact pads 112.

The leading edge carriage portions 132 provide compliance in the horizontal and vertical directions. Each of the leading edge portions 132 is comprised of a vertical spring portion 138 and a horizontal spring portion 140. Each leading edge portion 132 acts independently in the vertical and horizontal directions. A base 142 supports a vertical spring portion 138 is a container structure 144. The container structure 144 comprises a pair of c-shaped side walls 146, a bottom plate 148, and a top plate 150. A forward portion 151 and rearward portion 153 of walls 146 each contain vertical slots 152 to allow threaded rods 154 to extend from the top plate 150 through the walls 146 and limit the directional motion of the top plate 150. The threaded rods 154 are secured with conventional fasteners 156. The spring portion 138 may comprise a coil spring, air shock, pneumatics, or other conventional device used for creating and controlling the vertical compliance.

The horizontal spring portion 140 is located between a stop structure 160 and a leading edge surface 162 of one of the c-shaped walls 146. The stop structure 160 is firmly attached to the base 142 and a portion of which extends vertically parallel with surface 162. The bottom plate 148 of the container 144 is connected to the base 142 such that the container 144 is allowed to move in a translational direction 164 to stress the horizontal spring portion 140. The spring portion 140 may comprise a coil spring, air shock, pneumatics, or other conventional device used for creating and controlling the horizontal compliance.

A curb 170 of adjustable height is attached a portion of the container structure 144. The curb 170 is a vertical flange attached along the leading edge of the carriage 130 and projects vertically above the top surface plate 150 of each of the leading edge carriage portions 132. The curb 170 is used to generate a tripping impulse. The horizontal and vertical spring portions 138, 140 in the leading edge carriage portion 132 can be calibrated to yield a system response representative of a typical vehicle suspension during the roll initiation stages of a crash or rollover event.

The trailing edge portions 134 provides compliance is the vertical direction. A metal container 180 having vertical walls supports a top plate 182 at a desired test height and orientation. The top plate 182 is fabricated from man made materials such as plywood. In the alternative, a rubber or other manmade material may be substituted. Middle plates 184 may be added or subtracted to change the test orientation of the test apparatus 100. A layer of recycled tire material 184 provides additional compliance characteristics between the metal pan 180 and the top plate 182. In the alternative, the trailing edge portion 134 may further include a coil spring, air shock, pneumatics, or other conventional device may be substituted for recycled tire material 184 or used in combination with, for creating and controlling the vertical compliance.

Referring to FIG. 9-12, a preferred embodiment of a method of replicating a vehicle inertial event such as a rollover event using the test apparatus 100 will now be described. The rollover event comprises a lateral velocity phase, a lateral deceleration phase, a transition-to-rotation phase, a free-flight phase, and an impact phase.

Figure 9:
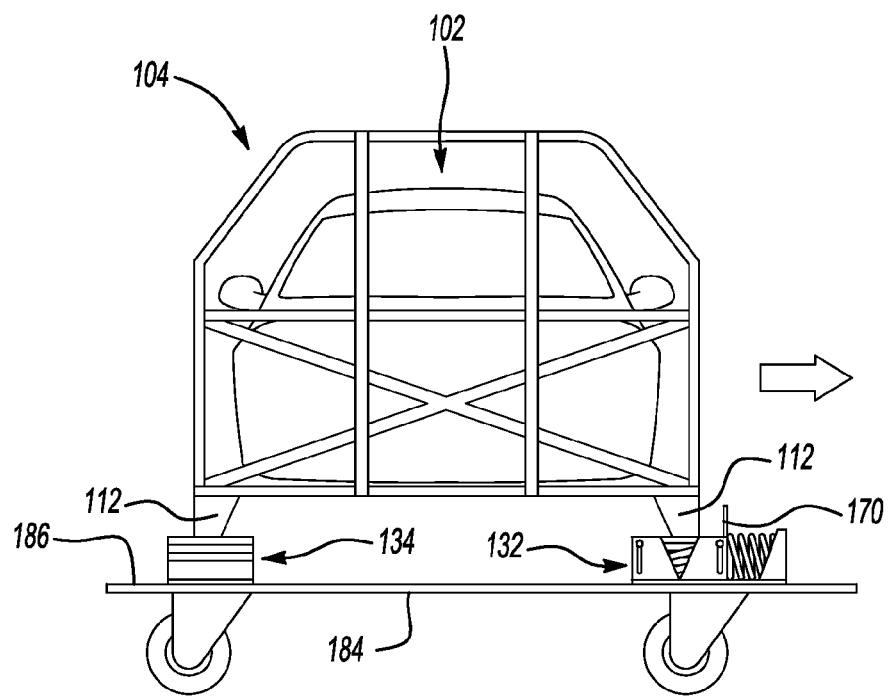
FIG. 9 a perspective view of the test apparatus according to the invention.

Referring to FIG. 9, the lateral velocity phase of the test method of the invention is described. The test apparatus 100 is placed on a moveable cart 184 in a level position. In the alternative, one or more of the middle plates 184 of the trailing edge portion 134 could be added or removed to achieve a non-level stance for the test apparatus 100. The cart 184 is a conventional unit well known in the art having a support surface 186, and control means either on-board or located remotely for accelerating and braking the cart. The cart and test apparatus 100 are accelerated until the test apparatus 100 reaches the desired constant velocity.

Figure 10:
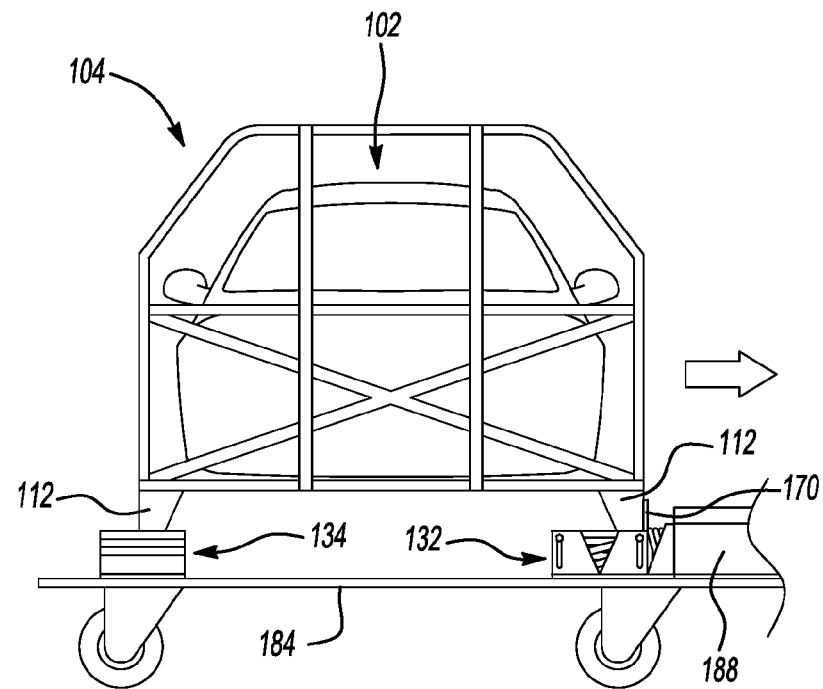
FIG. 10 is a perspective view of the test apparatus according to the invention.

Referring to FIG. 10, the lateral deceleration phase and the transition to rotation phase of the method for the present invention are described. Once the desired velocity is achieved by the test apparatus 100, a brake 188 is applied to decelerate the cart 184 causing the test apparatus 100 to experience a lateral deceleration force. The amount of braking force and the time at which the brake is implemented can be specified independently and will determine the deceleration pulse of the test. The deceleration pulse results in a lateral force initiating contact between the test apparatus 100 through that portion of the leading edge portion 132 of the carriage and the curb 170. The curb 170

"trips" the test apparatus 100 as the momentum transitions into rotational motion of the rigid shell 104 and the occupant compartment 102.

Figure 11:
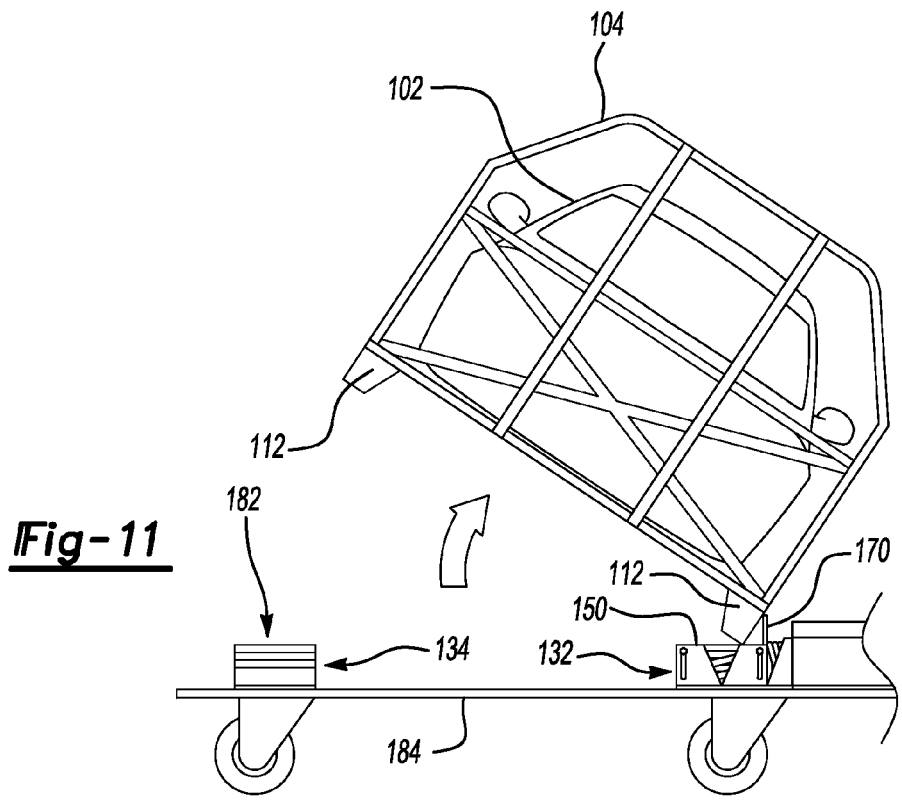
FIG. 11 is a perspective view of the test apparatus according to the invention.

Referring to FIG. 11, the transition to rotation phase is further described. The rigid shell continues to rotate over the curb 170. As the rigid shell 104 begins to rotate, the contact pads 112 begins to breakaway from the top surface 150 of the leading edge portion 132. The contact pads 112 have completely broken away from the top surface 182 of the trailing edge portion 134.

Figure 12:
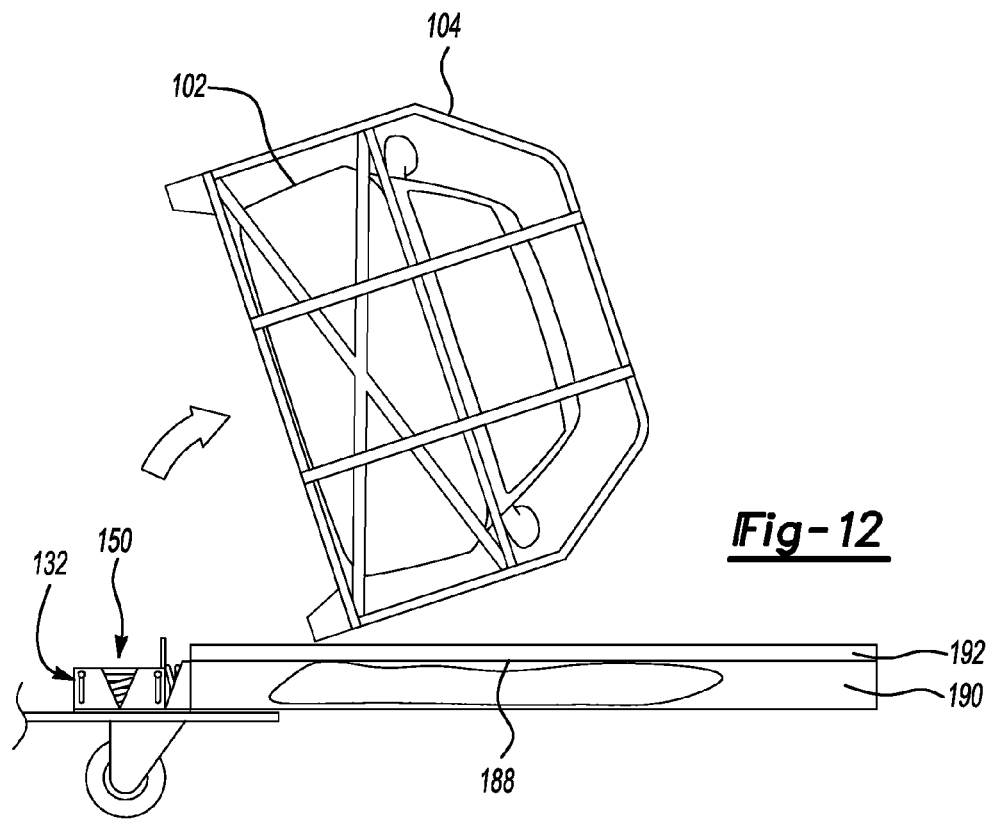
FIG. 12 is a perspective view of the test apparatus according to the invention.

Referring to FIG. 12, the free-flight phase of the method for the present invention is further described. The rigid shell 104 has completely rotated over the curb 170 and no longer rests on the carriage leading edge or trailing edge portions 132, 134 respectively. All contact pads 112 have lifted off the top surfaces 150, 182, respectively. The rigid shell 104 containing the occupant compartment 102 is in rotational free flight.

Next, the rigid shell 104 experiences an impact phase. The rigid shell 104 comes into contact with an impact pad 188 placed on the ground in the flight path. The impact pad 188 absorbs the energy of the impact of the inertial event or rollover. In a preferred embodiment the impact pad 188 comprises several rubber bladders 189 pressurized to a specified amount arranged symmetrically inside a steel box 190 and covered with plywood 192. The bladders 189 can be pressurized to give a variety of fixture to ground contact forces. The occupant compartment 102 experiences the impact but is protected by the rigid shell 104 preserving it from destructive damage. The occupant compartment 102 and rigid shell are reusable components that can be tested multiple times.

The test apparatus 100 and method described produces vehicle motion consistent with a real world tripped rollover crash test. The peak roll rate and roll angle time history were analyzed for one of the trial tests compared to similar tests done with full vehicles. Additional tests were run to determine the repeatability of the test apparatus 100. Data collected during discrete times of a tripped rollover event indicate high correlation of roll angle and roll rate data when comparing the test apparatus and a full vehicle test.

In the preferred embodiment shown in FIGS. 9-12, the carriage 130 is securely attached to the cart. In an alternative embodiment, the carriage 130 may be positioned loosely on the surface of the cart and the rigid shell contact pads would be securely attached to the carriage 130 instead.

While particular embodiments of the invention have been shown and described, variations and alternative embodiments will occur to those skilled in the art. Accordingly, it is intended that the invention be limited only in terms of the appended claims.

I claim:

1. An apparatus for simulating attributes of a vehicle during a certain inertial event, the apparatus comprising:
    an occupant compartment having at least one exterior surface;
    a rigid shell surrounding the occupant compartment; and,
    a carriage supporting the occupant compartment and the rigid shell, the carriage having adjustable members for representing specific vehicle characteristics wherein the rigid shell protects all of the exterior surfaces of the occupant compartment from non-elastic deformation during the certain inertial event.

2. The apparatus of claim 1, wherein the occupant compartment comprises a row of seat positions.

3. The method of claim 1, wherein the occupant compartment further comprises occupant protection systems.

4. The apparatus of claim 1, wherein the inertial properties of the rigid shell can be adjusted.

5. The apparatus of claim 1, wherein the rigid shell further comprises a surface of energy absorbing material.

6. The apparatus of claim 1, further comprising a data collection device for monitoring vehicle attributes during the certain inertial event.

7. The apparatus of claim 1, wherein the certain inertial event is a tripped rollover event.

8. The apparatus of claim 7, wherein the simulated attributes of the vehicle further include a plurality of tires and a suspension assembly.

9. A rollover test apparatus for vehicle components, the apparatus comprising:
    an occupant compartment having at least one exterior surface;
    a rigid shell encapsulating the occupant compartment; and,
    a carriage supporting the occupant compartment and the rigid shell wherein each of the at least one exterior surfaces of the occupant compartment is protected by the rigid shell from non-elastic deformation during the rollover event.

10. The rollover test apparatus of claim 9, wherein the rigid shell further comprises a surface of energy absorbing material.

11. The rollover test apparatus of claim 9, wherein the carriage further comprises an adjustable curb.

12. The rollover test apparatus of claim 9, wherein the carriage further comprises adjustable members for representing specific vehicle characteristics.

13. The rollover test apparatus of claim 12, wherein the carriage comprises a boxed air spring.

14. The rollover test apparatus of claim 12, wherein the carriage simulates the attributes of a vehicle suspension and vehicle tires.

15. The rollover test apparatus of claim 14, wherein the carriage further comprises a leading edge portion and a trailing edge portion.

16. The rollover test apparatus of claim 15, wherein the carriage leading edge portion further comprises horizontal compliance and vertical compliance for simulating the vehicle suspension and vehicle tires.

17. A method of simulating a tripped rollover event of a vehicle with a test apparatus, the test apparatus comprising a carriage, an occupant compartment having at least one exterior surface, and a rigid shell surrounding the occupant compartment, the rigid shell protecting each of the exterior surfaces of the occupant compartment from non-elastic deformation during the tripped rollover event, the method comprising the steps of:
    propelling the test apparatus at a desired lateral translational velocity;
    decelerating the test apparatus to arrest the motion of the occupant compartment;
    initiating rotational rollover motion of the occupant compartment; and,
    impacting a landing surface with the rigid shell wherein the exterior surfaces of the occupant compartment are protected by the rigid shell from non-elastic deformation.

18. The method of claim 17, further comprising the step of absorbing the energy from the impact of the rigid shell into the landing surface.

19. A method of simulating phases of a tripped rollover event of a vehicle with a test apparatus, the test apparatus comprising a carriage and an occupant compartment having at least one exterior surface surrounded by a rigid shell, the method comprising the steps of:

propelling the test apparatus at a desired lateral velocity during a lateral-velocity phase;

decelerating the test apparatus to arrest the motion of the occupant compartment during a deceleration phase;

initiating rotational rollover motion of the occupant compartment during a transition-to-rotation phase;

initiating a free flight condition of the rotating occupant compartment during a free-flight phase, and impacting a landing surface with the rigid shell during an impact phase wherein the rigid shell protects the exterior surface of the occupant compartment from non-elastic deformation during the impact phase.

20. The method of claim 19, further including the step of collecting data during each phase.

* * * * *